April 29, 1930.　　　F. L. GORMLEY　　　1,756,459
CHAIN HOIST
Filed July 12, 1929　　　3 Sheets-Sheet 3

Inventor:
Frank L. Gormley.
by Walter E. Lombard,
Atty.

Patented Apr. 29, 1930

1,756,459

UNITED STATES PATENT OFFICE

FRANK L. GORMLEY, OF CHICAGO, ILLINOIS

CHAIN HOIST

Application filed July 12, 1929. Serial No. 377,750.

This invention relates to chain hoists and has for its object the production of a device of this character which will be self-lowering at any desired speed and in which is included means preventing the accidental lowering of the load and other means for releasing the chain supporting member when quick action of the latter is desired.

This object is attained by the mechanism illustrated in the accompanying drawing.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings.

Similar characters indicate like parts throughout the several figures of the drawing.

Figure 1:
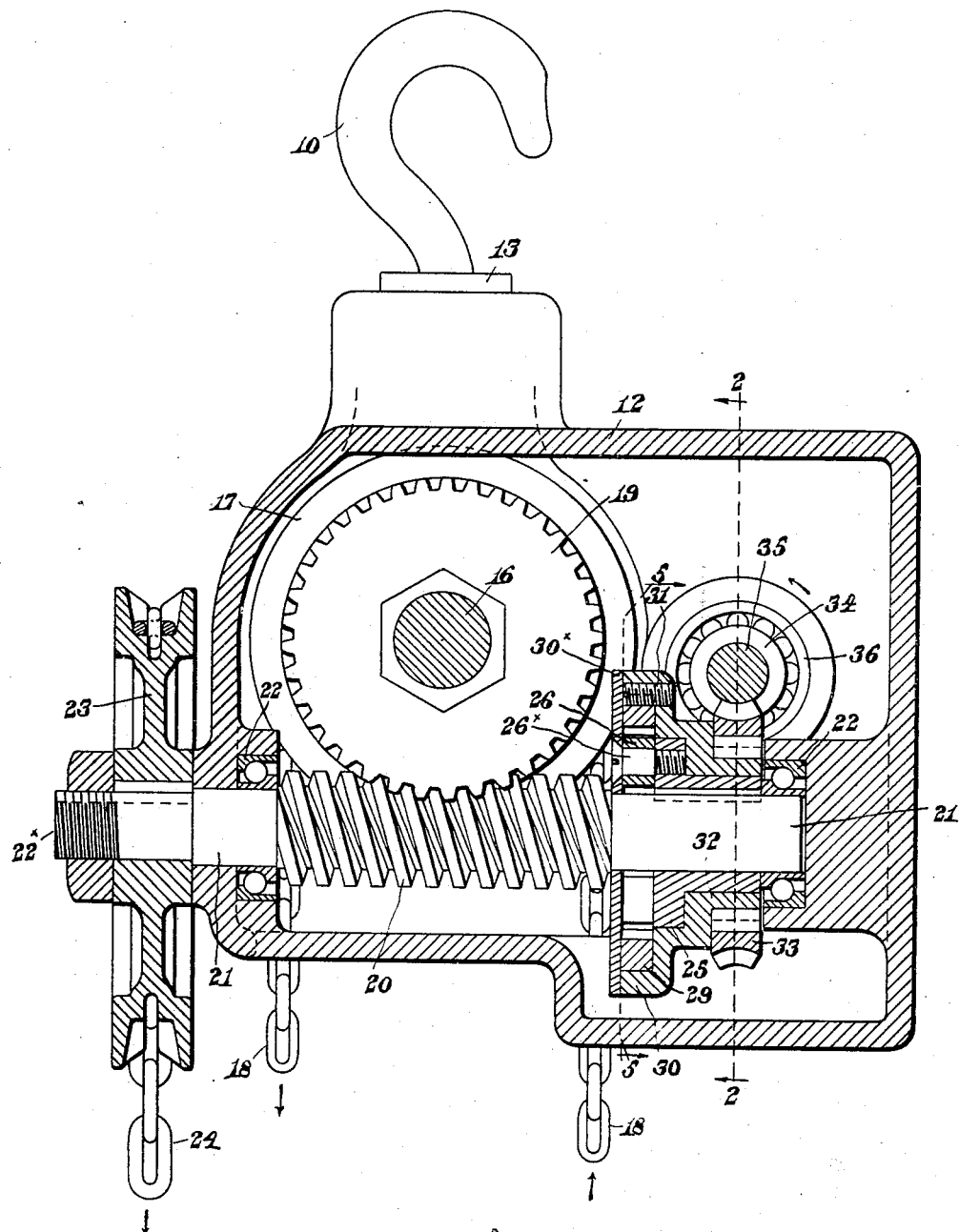
Figure 1 represents a vertical section of a chain hoist embodying the principles of the present invention, the cutting plane being on line 1, 1 on Fig. 2.

In the drawings, 10 is a suspension hook the lower end of which has a shank 11 mounted to swivel in a casing 12.

The shank 11 is provided with a flange 13 held in contact with the upper surface of the casing 12 by means of the nut 14.

Figure 2:
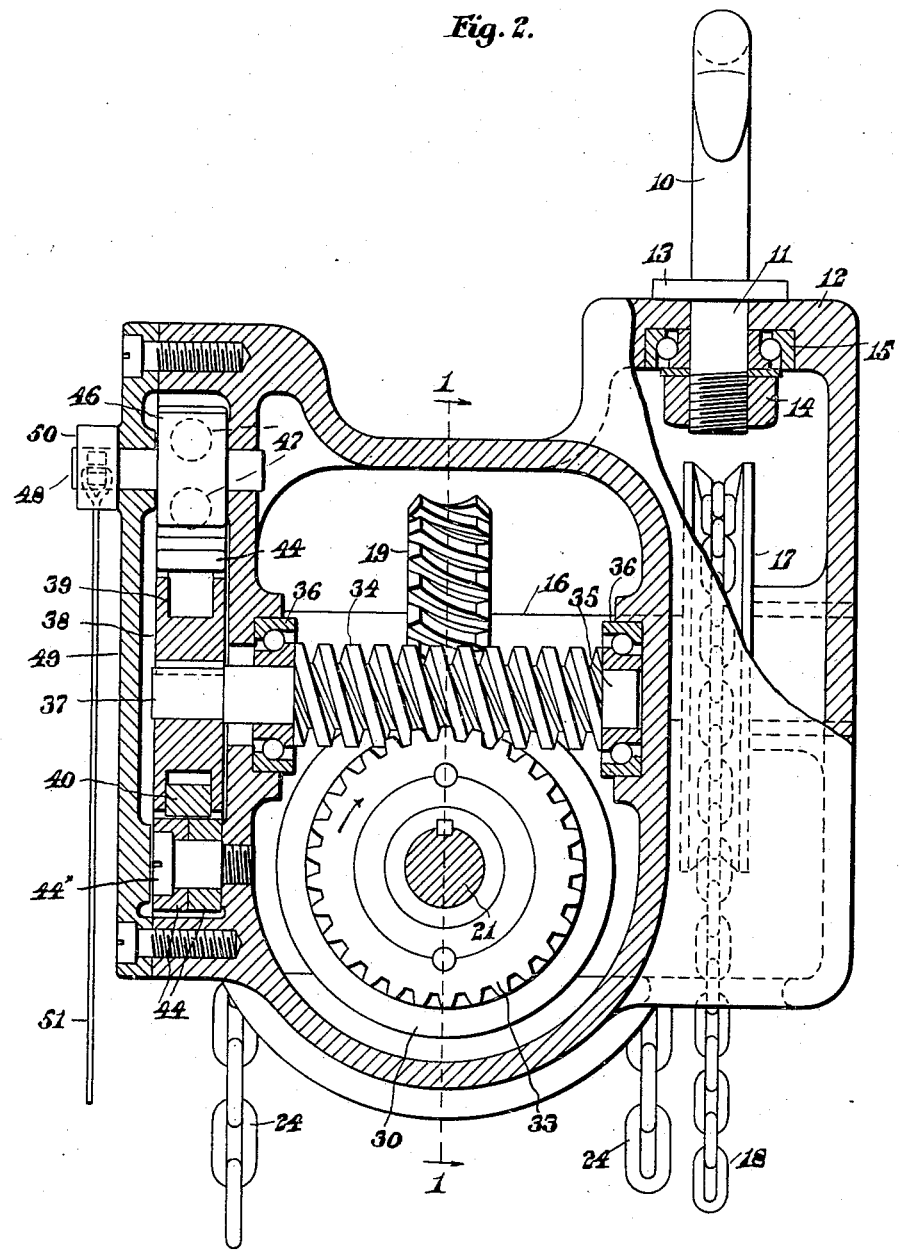
Figure 2 represents a section of the same on line 2, 2, on Fig. 1.

This shank 11 is freely revoluble in the anti-friction bearing 15, all as shown in Fig. 2 of the drawings.

Immediately beneath the suspension hook 10 and in the same vertical plane therewith is a shaft 16 revoluble in bearings in the casing 12.

Secured to and revoluble with this shaft 16 is a sprocket wheel 17 over which is disposed the chain 18 for lifting the load.

The shaft 16 has secured thereto a worm gear 19 which is driven by the worm 20 within the casing 12.

The worm 20 is formed upon a shaft 21 revoluble in anti-friction bearings 22 mounted in the walls of the casing 12.

This shaft 21 has at one end an outwardly extending shank 22× to which is keyed a sprocket wheel 23 over which passes the chain 24 which may be pulled in either direction to cause rotation of the worm 20 about its axis.

The opposite end of the shaft 21 has keyed thereto a flanged member 25 to which is pivoted a plurality of pawls 26 each having a plurality of teeth 27 on the free end thereof, which teeth engage the ratchet teeth 28 formed upon an annular member 29 disposed within a cup-shaped member 30 and locked thereto by means of the screws or studs 31.

The member 30 is closed by a plate 30× held in position by the screws 26× forming pivots for the pawls 26.

These pawls 26 are forced outwardly about their pivots 26× by the springs 21×, the inner ends of which are disposed in sockets in the shaft 21.

The hub 32 of this cup-shaped member has keyed thereto a worm gear 33 meshing with a worm 34 formed upon a shaft 35, the opposite ends of which are revoluble in anti-friction bearings 36.

One end of the shaft 35 has a shank 37 extending therefrom to which is keyed a brake wheel 38.

The periphery of this brake wheel 38 is provided with an annular groove 39 in which is disposed a plurality of shoes 40 pivoted to the brake wheel at 41.

The front end of each shoe 40 is provided with a transverse hole 42 through which extends a pin 43 mounted in the brake wheel 38.

The diameter of this pin 43 is less than the diameter of the hole 42 so that the shoes have limited outward movement about their pivots 41.

Inward movement of the shoes 40 is limited by the projections 40ˣ bearing against the bottom wall of groove 39.

The outer surface of the shoes 40 normally extends beyond the periphery of the disk 38.

Figure 3:
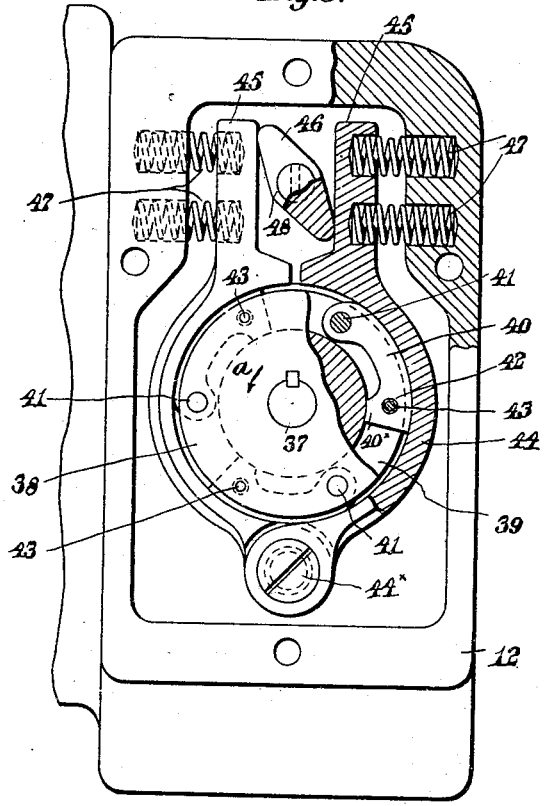
Figure 3 represents an elevation of the brake mechanism partly in section.
Figure 4:
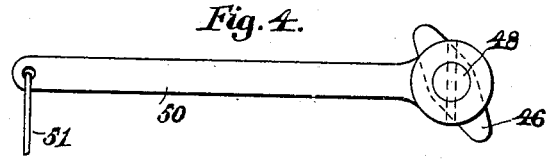
Figure 4 represents an elevation of the brake actuating lever.

Outside of the periphery of the brake wheel 38 are two curved brake levers 44 pivoted at 44ˣ, these levers having at their free ends parallel extensions 45 between which is mounted a cam member 46, all as shown in Fig. 3 of the drawings.

A plurality of springs 47 bear against the extensions 45 and retain the inner faces of the extensions 45 at all times in contact with the cam member 46.

The cam member 46 has a shank 48 extending through the cover plate 49 and to this shank is secured a cam lever 50, the free end of which has connected therewith a flexible pulling member 51.

By pulling the chain 24 the worm 20 may be rotated about its axis and cause, through the worm gear 19, a rotation of the shaft 16 and lifting chain sprocket wheel 17 thereby permitting the load to be raised.

Figure 5:
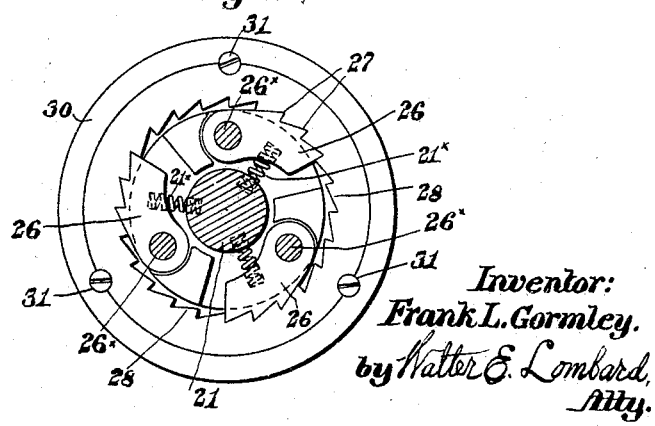
Figure 5 represents an elevation of the pawl and ratchet mechanism.

The ratchet mechanism as shown in Fig. 5 of the drawings permits the worm 20 to be rotated when raising the load, the teeth 27 of the pawl 26 freely moving over the teeth 28 of the annular member 29 secured to the cup-shaped member 30 to the hub of which the worm gear 33 is secured.

Rotation of the worm 20 in the opposite direction is prevented by the engagement of the worm gear 33 with the worm 34.

No lowering of the load can be accomplished, therefore, until the shaft 35 with the worm 34 thereon is permitted to rotate.

The brake wheel 38 being mounted upon the shank 37 of this worm 34, and the brake levers 44 being normally in contact with the outer surface of the shoes 40, no rotation of the shaft 35 can be accomplished until the brake levers 44 are removed from contact with said brake wheel.

When the operator desires to lower the load he seizes the pulling member 51 and moves the lever 50 downwardly causing the oscillation of the cam 46 to separate the extensions 45, thereby removing the brake levers 44 from contact with the shoes 40.

After the brake levers 44 are moved outwardly about their pivot 44ˣ, the brake wheel will be permitted to rotate in the direction of the arrow a on Fig. 3 of the drawings, and this rotation will by centrifugal action throw the shoes 40 outwardly about their pivots 41, remaining in light contact with the brake levers 44, thereby retarding the lowering.

This retarding of the lowering will be continued until the brake levers 44 are entirely free from contact with the shoes 40 when the load may be lowered very quickly.

While the brake levers 44 are in contact with the brake shoes 40, the load will lower at a uniform speed, and when these brake levers are opened wide enough to clear the travel of the shoes the load will lower at a greater speed.

As soon as the cam lever 50 is released the springs 47 will immediately cause the brake levers 44 to close on the shoes 40 and stop the lowering of the load at any point.

The lifting of the load may be effected in either direction by depressing the cam lever 50 while the chain 24 is being pulled.

This provides a ready means for automatically lowering the load by means of a chain hoist and stop the lowering of the load at any given point.

It also provides means whereby the load may be lowered at any desired speed.

While this desired result is obtained by the worms and worm gearing shown and described herein, it is quite obvious that other styles of speed-reduction gearing may be substituted therefor depending on the nature of the work and the weight of the loads to be lifted and lowered.

It is believed that the operation and many advantages of the invention will be understood without further description.

Having thus described my invention, I claim:

1. In a chain hoist, a casing provided with supporting means therefor; a shaft rotatable therein; a chain-supporting sprocket wheel revoluble with said shaft; a worm gear keyed to said shaft; a worm meshing with said gear; means on one end of said worm for rotating it; mechanism at the opposite end of said worm and operable thereby for retarding the rotation of said worm; and manually actuated means for releasing said retarding mechanism.

2. In a chain hoist, a casing provided with supporting means therefor; a shaft rotatable therein; a chain-supporting sprocket wheel revoluble with said shaft; a worm gear keyed to said shaft; a worm meshing with said gear; means on one end of said worm for rotating it; mechanism driven by said worm and including a second worm adapted to be driven in one direction only; a brake disk at the opposite end of said second worm and revoluble thereby; brake shoes pivoted to said disk; pivoted brake arms coacting with said shoes; a cam between the free ends of said arms; and means for moving said cam to remove said arms from said shoes.

3. In a chain hoist, a casing provided with supporting means therefor; a shaft rotatable therein; a chain-supporting sprocket wheel revoluble with said shaft; a worm gear keyed to said shaft; a worm meshing with said gear; means on one end of said worm for rotating it; a smaller worm gear; a one-way clutch between said worm and smaller worm gear whereby the latter may be rotated in one direction only; a smaller worm meshing with said smaller worm gear; a brake disk revoluble with said smaller worm; brake shoes pivoted to said disk and normally extending beyond the periphery thereof; pivoted brake arms coacting with said shoes, and manually actuated means for removing said arms from contact with said shoes.

4. In a chain hoist, a casing provided with supporting means therefor; a shaft rotatable therein; a chain-supporting sprocket wheel revoluble with said shaft; a worm gear keyed to said shaft; a worm meshing with said gear; a smaller worm gear; a one-way clutch between said worm and smaller worm gear whereby the latter may be rotated in one direction only; a smaller worm meshing with said smaller worm gear; a brake disk revoluble with said smaller worm; brake shoes carried by said disk and normally extending beyond the periphery thereof; spring-pressed brake arms coacting with said shoes; a cam between the free ends of said arms; means for rotating said cam to cause separation of said arms from shoes; a sprocket wheel revoluble with the main worm; and a chain on said worm sprocket wheel for imparting rotation thereto.

5. In a chain hoist, a casing provided with supporting means therefor; a shaft rotatable therein; a chain-supporting sprocket wheel revoluble with said shaft; a worm gear keyed to said shaft; a worm meshing with said gear; a smaller worm gear; a one-way clutch between said worm and smaller worm gear whereby the latter may be rotated in one direction only; a smaller worm meshing with said smaller worm gear; a brake disk revoluble with said smaller worm; brake shoes pivotally mounted in a peripheral groove in said disk and adapted to move outwardly; pivoted brake arms normally coacting with said shoes; manually actuated means for removing said arms from contact with said disk; a sprocket wheel revoluble with the main worm; and a chain on said worm sprocket wheel for imparting rotation thereto.

6. In a chain hoist, a casing provided with supporting means therefor; a shaft rotatable therein; a chain-supporting sprocket wheel revoluble with said shaft; a worm gear keyed to said shaft; a worm meshing with said gear; manually actuated means for rotating said worm; a smaller worm gear; a one-way clutch between said worm and smaller worm gear whereby the latter may be rotated in one direction only; a smaller worm meshing with said smaller worm gear; a brake disk revoluble with said smaller worm; brake shoes pivotally mounted in a peripheral groove in said disk and having limited movement outwardly beyond the periphery of said disk; brake arms normally coacting with said shoes; and manually actuated means for separating said arms.

7. In a chain hoist, a casing provided with supporting means therefor; a shaft rotatable therein; a chain-supporting sprocket wheel revoluble with said shaft; a worm gear keyed to said shaft; a worm meshing with said gear having a steep pitch thread; manually actuated means for rotating said worm; a smaller worm gear; a one-way clutch between said worm and smaller worm gear whereby the latter may be rotated in one direction only; a smaller worm meshing with said smaller worm gear; a brake disk revoluble with said smaller worm; pivoted brake arms coacting with said disk; and manually actuated means depending from said casing for removing said arms from contact with said disk.

8. In a chain hoist, a casing; a supporting hook swivelled thereto; a shaft rotatable therein; a chain-supporting sprocket wheel revoluble with said shaft and in the same plane with the axis of said hook; a worm gear keyed to said shaft; a worm meshing with said gear; means on one end of said worm for rotating it; mechanism at the opposite end of said worm and operable thereby for retarding the rotation of said worm; and manually actuated means for releasing said retarding mechanism.

9. In a chain hoist, a casing provided with supporting means therefor; a shaft rotatable therein; a chain-supporting sprocket wheel revoluble with said shaft; a worm gear keyed to said shaft; a worm meshing with said gear; means on one end of said worm for rotating it; mechanism driven by said worm and including a second worm and a one way clutch whereby said second worm may be rotated in one direction only; a brake disk at the opposite end of said worm and revoluble thereby; brake shoes pivoted to said disk; brake arms coacting with said shoes; manually actuating means for separating said arms from said shoes; and means for limiting the outward movement of said shoes while in contact with said arms.

10. In a chain hoist, a casing provided with supporting means therefor; a shaft rotatable therein; a chain-supporting sprocket wheel revoluble with said shaft; a worm gear keyed to said shaft; a worm meshing with said gear; means on one end of said worm for rotating it; mechanism driven by said worm and including a second worm and a one way clutch whereby said second worm may be rotated in one direction only; a brake disk at the opposite end of said worm and revoluble thereby; brake shoes pivoted to said disk; pivoted brake arms normally coacting with said shoes; a cam between the free ends of said arms; and manually actuated means for moving said cam to remove said arms from said shoes.

11. In a chain hoist, a casing provided with supporting means therefor; a shaft rotatable therein; a chain-supporting sprocket wheel revoluble with said shaft; a worm gear keyed to said shaft; a worm meshing with said gear; manually actuated means for rotating said worm; a smaller worm gear; a one-way clutch between said worm and smaller worm gear whereby the latter may be rotated in one direction only; a smaller worm meshing with said smaller worm gear; a brake disk revoluble with said smaller worm; pivoted brake arms surrounding the periphery of said disk; and manually actuated means for moving said arms outwardly from the periphery of said disk.

12. In a chain hoist, a casing provided with supporting means therefor; a shaft rotatable therein; a chain-supporting sprocket wheel revoluble with said shaft; a worm gear keyed to said shaft; a worm meshing with said gear; means on one end of said worm for rotating it; a one way clutch at the opposite end of said worm and revoluble thereby; a second worm gear on said worm adapted to be revolved in one direction only; a second worm adapted to be revolved by said second worm gear; a brake disk revoluble with said second worm; brake shoes pivoted to said disk; brake arms coacting with said shoes; and manually actuated means for separating said arms from said shoes.

13. In a chain hoist, a casing provided with supporting means therefor; a shaft rotatable therein; a chain-supporting sprocket wheel revoluble with said shaft; a worm gear keyed to said shaft; a worm meshing with said gear; means on one end of said worm for rotating it; mechanism driven by said worm and including a second worm adapted to be driven in one direction only; a brake disk at the opposite end of said second worm and revoluble thereby; brake shoes pivotally mounted in a peripheral groove formed in said disk; brake arms normally coacting with said shoes; and manually actuated means for separating said arms from said shoes.

14. In a chain hoist, a casing provided with supporting means therefor; a shaft rotatable therein; a chain-supporting sprocket wheel revoluble with said shaft; a worm gear keyed to said shaft; a worm meshing with said gear; means on one end of said worm for rotating it; mechanism driven by said worm and including a second worm adapted to be driven in one direction only; a brake disk at the opposite end of said second worm and revoluble thereby; brake shoes pivoted to said disk and normally extending beyond the periphery thereof; brake arms adapted to coact with said shoes; springs for retaining said arms in contact with said shoes under normal conditions; and manually actuated means for separating said arms from said shoes.

15. In a chain hoist, a casing provided with supporting means therefor; a main shaft rotatable therein; a chain-supporting sprocket wheel revoluble with said main shaft; a brake disk; speed reduction gearing between said main shaft and disk including a one-way clutch adapted to control the rotation of said brake disk in one direction only; a second shaft driven by said speed reduction gearing to which said disk is secured; brake shoes pivotally mounted on said disk; brake arms coacting with said shoes; and manually actuated means for separating said arms from said shoes.

16. In a chain hoist, a casing provided with supporting means therefor; a main shaft rotatable therein; a chain-supporting sprocket wheel revoluble with said main shaft; a brake disk; mechanism interposed between said main shaft and disk and including a one way clutch whereby said disk may be rotated in one direction only; a second shaft driven by said mechanism to which said disk is secured; brake shoes pivoted to said disk and normally extending beyond the periphery thereof; brake arms coacting with said shoes, springs for retaining said arms in contact with said disk under normal conditions; and manually actuated means for separating said arms from said shoes.

17. In a chain hoist, a casing provided with supporting means therefor; a main shaft rotatable therein; a chain-supporting sprocket wheel revoluble with said main shaft; a brake disk; mechanism driven from said main shaft and including a one way clutch whereby said disk may be rotated in one direction only; a second shaft driven by said mechanism to which said disk is secured; spring-pressed brake arms coacting with said disk; means for separating said arms; a wheel on the outer end of said main shaft; and means coacting therewith whereby rotary movement may be imparted thereto.

18. In a chain hoist, a casing provided with supporting means therefor; a main shaft rotatable therein; a chain-supporting sprocket wheel revoluble with said main shaft; a brake disk; mechanism driven by said main shaft adapted to rotate said disk in one direction only; a second shaft driven by said mechanism to which said disk is secured; brake shoes pivotally mounted in a peripheral groove in said disk and adapted to move outwardly beyond the periphery of said disk; pivoted brake arms coacting with said shoes; manually actuated means for removing said arms from contact with said shoes; a wheel on the outer end of the main shaft; and means coacting therewith whereby rotary movement may be imparted thereto.

19. In a chain hoist, a casing provided with supporting means therefor; a main shaft rotatable therein; a chain-supporting sprocket wheel revoluble with said main shaft; a worm gear keyed to said main shaft; a worm meshing with said gear; means depending from said casing for rotating said main shaft; mechanism driven by said worm; a brake disk; mechanism driven by said worm adapted to rotate said disk in one direction only and including a driven shaft to which said disk is secured; brake shoes pivotally mounted in a peripheral groove in said disk and having limited movement outwardly beyond the periphery of said disk; brake arms normally contacting with said shoes; and means depending from said casing for separating said arms from said shoes.

20. In a chain hoist, a casing provided with supporting means therefor; a main shaft rotatable therein; a chain-supporting sprocket wheel revoluble with said main shaft; a worm gear keyed to said main shaft; a worm meshing with said gear; means depending from said casing for rotating said main shaft; a brake disk; mechanism driven by said worm adapted to rotate said disk in one direction only and including a driven shaft to which said disk is secured; shoes carried by said disk and movable outwardly by centrifugal force; pivoted brake arms normally coacting with said shoes; a cam for removing said arms from contact with said shoes; an arm radiating from the axis of said cam; and a pulling member depending from the free end of said arm.

Signed by me at Chicago, Illinois, this 9th day of July, 1929.

FRANK L. GORMLEY.